UNITED STATES PATENT OFFICE.

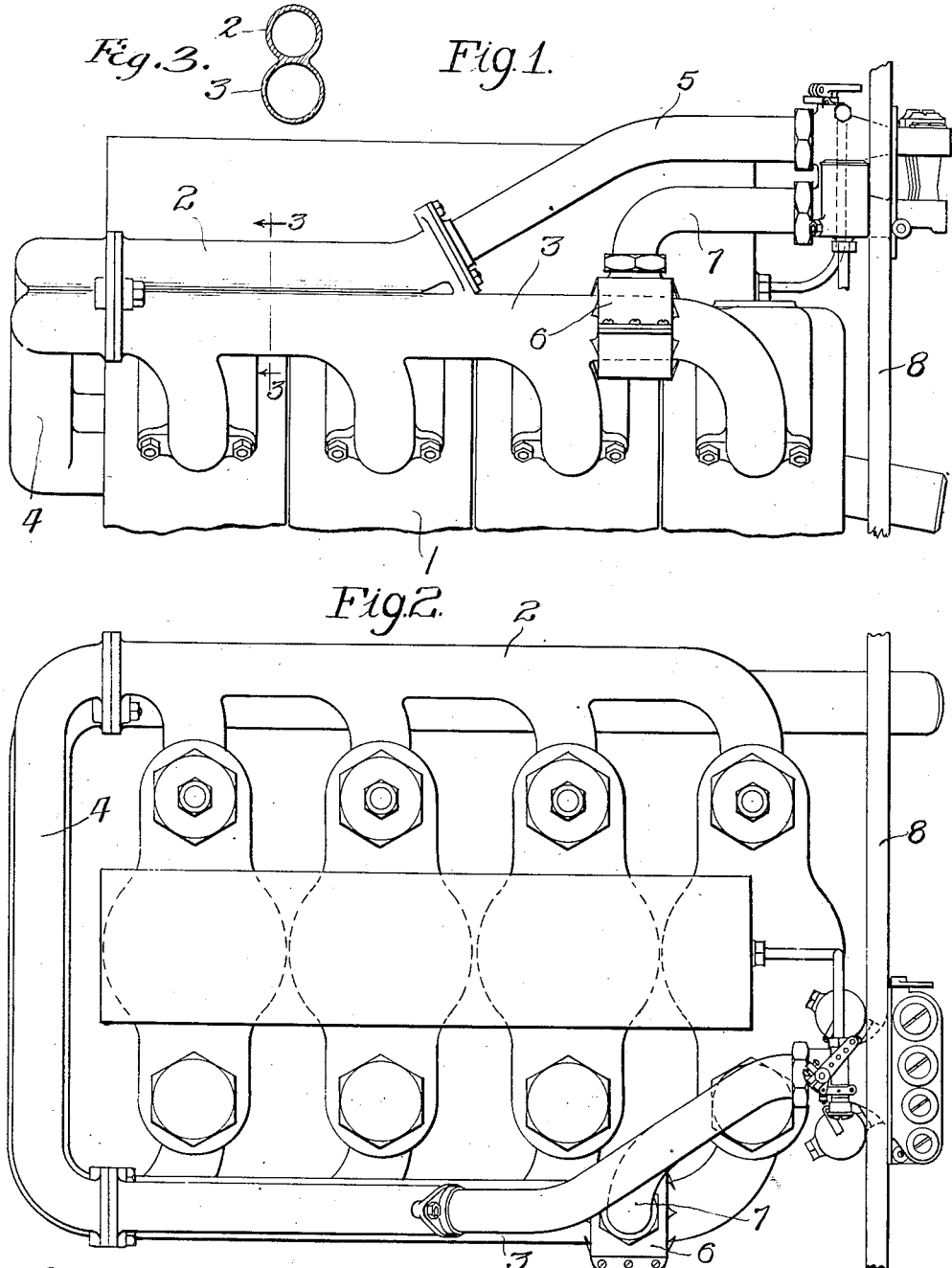

LEVI S. GARDNER, OF SHREVEPORT, LOUISIANA.

MANIFOLD.

1,246,903.

Specification of Letters Patent.

Patented Nov. 20, 1917.

Application filed November 17, 1913. Serial No. 801,356.

*To all whom it may concern:*

Be it known that I, LEVI S. GARDNER, a citizen of the United States, residing at Shreveport, parish of Caddo, State of Louisiana, have invented a certain new and useful Improvement in Manifolds, and declare the following to be a full, clear, and exact description of the same, such as will enable others skilled in the art to which it pertains to make and use the same, reference being had to the accompanying drawings, which form a part of this specification.

My invention has for its principal object to produce a simple carbureting appliance for efficiently and conveniently utilizing heavy fuels.

It is difficult to start the ordinary gasolene engine on heavy fuels when cold and therefore, when it is intended to operate on heavy fuels it is desirable to have some means for permitting the engine to be started on the lighter fuels.

In operating on heavy fuels it is preferable to have in addition to the ordinary mechanical carbureting means some means to heat the carbureted air so as to insure that the fuel will be reduced to vapor and will not remain in a liquid state or condense into the form of a liquid on its way to the engine cylinders. One of the objects of my invention is to produce a simple and novel means for utilizing the heat of the exhaust gases of an engine to supply the desired heat to the mixture approaching the engine.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a fragment of an engine having applied thereto my improved carbureting appliances;

Fig. 2 is a top plan view of the parts shown in Fig. 1; and

Fig. 3 is a section on line 3—3 of Fig. 1.

Referring to the drawings, 1 represents an internal combustion engine of any suitable form and construction, 2 and 3 representing intake and exhaust manifolds arranged on opposite sides of the engine cylinders. In accordance with one feature of my invention I extend the exhaust manifold around one end of the engine and down the opposite side beneath the intake manifold and I also extend the intake manifold across the end of the engine in proximity to the exhaust manifold and along the exhaust side of the engine to a convenient point for connection with the supply pipe leading from the carbureter. The intake and exhaust manifolds may conveniently be cast together so that the exhaust manifold forms one wall of the intake manifold and thus serves to heat the gaseous mixture flowing through the intake manifold to as high a degree as is desirable. In the particular arrangement shown, the manifolds are made in the form of three castings having approximately the cross section illustrated in Fig. 3, there being two castings, 3, one lying on each side of the engine and a third casting, 4, extending across the end of the engine. The end of the intake manifold farthest from the inlet valves of the engine is connected to a fuel supply conduit, 5. The inlet end of the inlet manifold, extended, terminates short of the receiving end of the exhaust conduit so as to leave room for placing upon the exhaust conduit a fitting, 6, through which the air taken into the carbureter through the inlet pipe 7 must pass, thus forcing the air which is taken by the carbureter to flow over the hot exhaust manifold and causing the air to be highly heated.

In the arrangement shown, the carbureter is of the general type disclosed in my prior application Serial No. 729,071, filed November 1, 1912, and is mounted on the dash, 8, of an automobile.

All of the air entering the carbureter passes into the fitting, 6, surrounding the exhaust manifold and is heated to a high degree as soon as the manifold has become hot. This hot air entering the carbureter heats the carbureter walls including the walls of the fuel manifold, so that the fuel itself is heated before it is delivered to the nozzle. The result is that both the air and the fuel are quite hot and are of substantially the same temperature when brought in contact with each other so that there is more perfect vaporization of the fuel than would otherwise take place and heavier fuels can be employed than could be effectively handled in a cold carbureter. Furthermore, since the entire body of the carbureter is warm soon after the engine begins to run, the danger of condensation in the carbureter is greatly reduced. After the carbureted mixture leaves the carbureter it passes into the extensions of the inlet manifold of the engine and finally through the inlet manifold and into the engine, the inlet manifold and its extensions serving also the purpose of a long retort having extended heating surfaces which, because of the heat supplied from the adjacent exhaust manifold, raises the temperature of the incoming charge, prevents condensation and increases vaporization; and consequently makes it possible to produce a perfect gaseous mixture even though quite heavy fuels are employed. It will also be seen that the heating function of the inlet manifold is automatically regulated to suit the demands of the engine, more heat being supplied as the speed of the engine increases, that is as the amount of fuel taken increases.

While I have illustrated and described with particularity only a single preferred form of my invention, I do not desire to be limited to the exact structural details thus illustrated and described, but intend to cover all forms and arrangements which fall within the terms employed in the definitions of my invention constituting the appended claims.

I claim:

1. In an internal combustion engine, an inlet manifold and an exhaust manifold lying on opposite sides of the engine each of said manifolds having an extension extending past one end of the engine and along the other manifold, the inlet end of the extension to the inlet manifold and the outlet end of the extension to the exhaust manifold lying on the same end of the engine.

2. In an internal combustion engine, two conduits extending along two sides and across one end of the engine, one of said conduits being connected to the engine cylinders and serving as the exhaust manifold, the other conduit being connected to the other side of the engine and serving as the inlet manifold.

3. In combination, an internal combustion engine having an inlet manifold on one side and an exhaust manifold on the other side, a carbureter, a supply conduit leading from the carbureter to the inlet manifold, and an extension of the exhaust manifold lying in proximity to said conduit and extending to the inlet manifold.

4. In an internal combustion engine, an inlet manifold and an exhaust manifold lying on opposite sides of the engine, each of said manifolds having an extension extending past the engine and along the other manifold.

In testimony whereof, I sign this specification in the presence of two witnesses.

LEVI S. GARDNER.

Witnesses:
WM. F. FREUDENREICH,
RUTH E. ZETTERVALL.